United States Patent [19]

Kühn

[11] Patent Number: 4,686,663
[45] Date of Patent: Aug. 11, 1987

[54] TRACK FOLLOWER SYSTEM EMPLOYING AN OPTICAL SCANNER WITH AUTOMATIC CONTROL OF A ROTATABLY MOVABLE PHASE GRATING USED FOR THE GENERATION AND POSITIONING OF READ BEAM SPOTS

[75] Inventor: Hans-Robert Kühn, St. Georgen, Fed. Rep. of Germany

[73] Assignee: Deutsche Thomson-Brandt GmbH, Villingen, Fed. Rep. of Germany

[21] Appl. No.: 623,971

[22] Filed: Jun. 25, 1984

[30] Foreign Application Priority Data

Jun. 25, 1983 [DE] Fed. Rep. of Germany ....... 3323007

[51] Int. Cl.$^4$ .............................................. G11B 7/09
[52] U.S. Cl. ...................................... 369/46; 369/44; 369/106; 369/109
[58] Field of Search .................................. 369/44–46, 369/106, 109; 250/201, 202

[56] References Cited

U.S. PATENT DOCUMENTS

| | | | |
|---|---|---|---|
| 3,876,842 | 4/1975 | Bouwhuis | 369/46 X |
| 4,338,682 | 7/1982 | Hosaka et al. | 369/46 X |
| 4,340,950 | 7/1982 | Kosaka | 369/44 |
| 4,462,095 | 7/1984 | Chen | 369/46 X |
| 4,494,154 | 1/1985 | Akiyama | 369/46 X |
| 4,539,665 | 9/1985 | Iso et al. | 369/46 X |
| 4,544,872 | 10/1985 | Hirano et al. | 369/46 X |
| 4,547,872 | 10/1985 | Henmi et al. | 369/45 |

FOREIGN PATENT DOCUMENTS 0073066 3/1983 European Pat. Off. .
0089736 9/1983 European Pat. Off. .

OTHER PUBLICATIONS

Carasso, M. G., Peek, J. B. H., Sinjou, J. P., Compact Disc Digital Audio System, 1982, pp. 151–155, Philips Tech. Review, vol. 40.

Primary Examiner—Raymond F. Cardillo
Assistant Examiner—Wayne R. Young
Attorney, Agent, or Firm—Horst M. Kasper

[57] ABSTRACT

A radially acting track follower system is provided with an optical scanner pickup for an audio or video record playback apparatus. The system generates three light spots disposed on a line with a movable phase grating (diffraction grating) and the three spots can be adjusted relative to the tangent at the track pickup scanning location. The middle or main light spot serves to provide scanning of the track signal information. The two outer or auxiliary light spots serve to provide readjustment. They are displaced radially oppositely to each other by equal amounts and are disposed at equal distances from the middle spot. The light intensity of the outer spots is picked up by detectors and processed into control signals. These are used as a drive for the phase grating, which can be controlled around its center point and the rotation axis of the phase grating coincides with the light beam, which can be provided by a semiconductor laser. The drive can operate electrodynamically or can be provided by a piezoelectrical torsion converter. The control signal can have for example 10 kilohertz and is superposed to the control signal for the drive and it improves the sensing and following properties of the system without the disadvantage of the superposition of the scanned information signal with the control signal.

19 Claims, 12 Drawing Figures

STATE OF THE ART

STATE OF THE ART

STATE OF THE ART a) WITHOUT α' ERROR ANGLE b) WITHOUT ERROR ANGLE α' WITH A' (DELAY OF A)

c) WITH ERROR ANGLE α' WITH A' (DELAY OF A)

TRACK FOLLOWER SYSTEM EMPLOYING AN OPTICAL SCANNER WITH AUTOMATIC CONTROL OF A ROTATABLY MOVABLE PHASE GRATING USED FOR THE GENERATION AND POSITIONING OF READ BEAM SPOTS

BACKGROUND OF THE INVENTION

1. Field of the Invention

The present invention relates to a radially acting track follower system with an optical sensor for an audio or video disk record player.

2. Brief Description of the Background of the Invention Including Prior Art

The radial error signal for the radial readjustment can be generated by two additional light spots disposed in tangential direction relative to the track as is taught in German Patent DE-PS No. 2,320,477 (corresponding to U.S. Pat. No. 4,547,872). They are disposed at an equal distance from the main light spot and their centers are on a line and they are staggered in radial direction oppositely to the center of the track such that in case of a radial deviation of the track under the light spots there are generated opposite effects at the two auxiliary light spots. The reflected intensities of the two auxiliary light spots are sensed separately from each other and from the reflected light intensity of the main spot with appropriate detection means.

It is known from U.S. Pat. No. 3,876,842 from the summary and from FIGS. 1 and 4 together with the respective description that also an adjustable phase grating or diffraction grating can be employed. Here three scanning spots ($LB_1$, LB and $LB_2$ of FIG. 1) disposed on a line are generated. The center scanning spot also is employed for reading the information and for controlling the focussing and the two outer scanning spots ($LB_1$, $LB_2$) are employed for controlling the track.

It is also known from the initially mentioned patent to generate a total of three spots with a phase grating, which is adjustable over a small angle constructed for the one-time adjustment according to conventional apparatus constructions in a plane vertical to the light beam bundle around a rotation center point, which is not the center of the phase grating, but which is outside of the phase grating. A required rotation is provided mechanically via a lever with an adjustment set screw accessible from the outside of the apparatus.

A similar adjustment provision is taught in the European Patent Application Laid Open No. 0,073,066. Here an optical scanner is constructed according to the multiple three beam principle (FIG. 5 and the respective description) and it is mentioned to achieve a certain desired angle setting of the two scanning spots ($6a$, $6b$, $6c_2$ and $6a_2$, $6b$, $6c$) by a rotation of the diffraction grating plates ($4a$, $4b$). Thereby the angles ($\theta_1$ and $\theta_2$) of the two three beam systems are adjusted.

In the context of the present invention a phase grating includes a diffraction grating, which is an optical device comprising an assembly of narrow slits or grooves, which produce a large number of beams that can interfere to produce spectra. Preferably the grating is a substantially transparent optical medium, however a reflecting mirror could also be used under changing transmission optical components and the light path shown in the present application into a reflection optical component and corresponding light path.

All these conventional optical scanners accoring to the three beam principle are associated with the following disadvantages:

1. They cannot be employed, where based on the construction principle only one single radial control is provided with a tilting lever, since a tangential error angle, depending on the just scanned track radius and associated with such control, results in such a shifting of the position of the auxiliary light spots relative to the track such that a maintenance of the track is not any longer possible.

2. In case of a radial linear system with coarse and fine track readjustment there results the difficulty of an unfavorbale radial shifting of the two auxiliary light spots relative to the track in case of only very small deviations in the guiding of the radial adjustment based on the different curvature of the track depending on the scanning radius. Therefore, the maintaining of the track becomes deficient or a loss of the track can occur.

It is further known from "Philips Technical Review, 40/82, page 154" that a radially acting control signal can be applied to the radial track follower system for the improvement of the guide following properties, where the control signal effects a radial swinging back and forth of the light spots at a frequency of 600 hertz and with an amplitude of 0.05 micrometers. The radial swinging motion of the scanning device results in a superposition of the light intensitites on the detection elements. Conclusions can be reached relating to a possible asymmetry of the optical system by corresponding sum formation, filtering and comparing with the original control signal and thus errors in the radial error signal can be determined and avoided. However, such a control provision is associated with the disadvantage, that the control signal is superposed to the scanned information signals, that is it is buried in the information spectrum contents. Therefore, it is not possible to employ a higher frequency for the control signal, since the energy components of the information signals initially increase with increasing frequency. However, it would be desirable to employ a frequency higher than for example 500 or 600 hertz, since only then a sufficient distance can be achieved relative to the frequency spectrum of the radial error signals.

SUMMARY OF THE INVENTION

1. Purposes of the Invention

It is an object of the present invention to provide an optical scanner related to the three beam principle, which can be easily mounted on radial tilting levers.

It is another object of the present invention to provide a track following system, which provides an excellent automatic readjustment of the fine track adjustment control.

It is a further object of the present invention to provide a track following system, where the scanning signal obtained can be easily processed and employed for automatic track control.

These and other objects and advantages of the present invention will become evident from the description which follows.

2. Brief Description of the Invention

The present invention provides a radially acting track follower device which comprises a light source generating a light beam, a rotary movable phase grating disposed in the path of the light beam and generating three light spots about disposed in a line on a record disk where the outer spots are at about equal distance of the center spot and where the outer spots can be adjusted in their position relative to the tangent at the track sensing position and where the phase grating is rotatably disposed around its center axis and where the position of the center axis corresponds to the beam axis of the center light spot at the level of the phase grating, detection means for the center light spot after reflection based on the information contents of the track, electronic processing means connected to the detection means for processing the signal from the detection means, separate detection means for the reflected light bundles of the outer light spots, which are radially displaced oppositely by about and equal amount, control means connected to the separate detection means to provide control and automatic adjustment signals for the radial track following, and electromechanical device means connected to the control means to actuate an angular rotation of the pase grating around the center axis.

The recorder can be a phonograph player on a video recorder. A focussing adjustment means can be connected to the detection means for the center light spot. The electromechanical drive means can be an electrodynamic arrangement or a piezoelectric arrangement.

A radially magnetized magnet ring can have attached the phase grating formed as a disk, which magnet ring is rotatably disposed at two bearings at the casing, two coils are disposed at the case and separated by an air gap from the magnet ring, which upon a corresponding current flow generate a torque on the magnet ring. A frame can have attached the phase grating formed as a disk, where the frame is rotatably supported near the axis. A piezoelectric tension bending provision can actuate a protruding bearing axis of the frame. A rotary support can be provided for a second bearing axis of the frame. A deflection mirror can be disposed after the phase grating.

The phase grating provision can be driven by a control signal having a frequency of at least about 1000 hertz. The drive of the phase grating can cause a dislocation of the outer light spots of less than about 0.04 micrometer. An elastic element can be disposed between the rotary part of the phase grating and a casing, which elastic element generates a radial restoring force and which damps the motion of the phase grating.

A tube can support the phase grating at one of its ends. A laser diode can be mounted at the other end of the tube; and a magnet ring can be attached to about the middle of the tube. The separate detection can comprise a first detection element A coordinated to one light spot of the track control, a second detection element B coordinated to a second light spot of the track control; an electronic phase shifting means for delaying the signal generated by the first detection element by half a period of the control signal, adding means for adding the phase shifted signal from the first detection element and the signal from the second detection element such that in case of an optimum position of the two light spots relative to the track to be followed a sum of signal S of about 50 percent of the maximum sum signal results, while an angular rotation results in a shift of the control signal in each case in the positive or, respectively, negative region, for controlling the phase grating with the resulting signal.

A memory storage can be provided for storing angular deviations at a certain sensing radii for a certain record player typical for sensing errors and/or proportional to angular deviations and having an output, an analog digital converter connected to the output of the memory storage and having in turn an output providing the control signal for the controllable phase grating, where both for the regular sensing process as well as for the operating mode "Search Run" binary signal, sequences are calculated based on the accumulated time present on the disk as information.

There is also provided a method for following a track of a record comprising providing light with a light source generating three light spots disposed on a line with a phase grating rotatable around its center axis and the position of the center axis corresponds to the beam axis for a center light spot at the level of the phase grating, adjusting the light spots in their position relative to the tangent at the track sensing position by controlling the phase grating in its rotary position by an electromechanical drive means for an angular rotation around the center axis, sensing the reflected light of the center light spot to provide a signal to be used for the information contents of the track, electronically processing the sensed reflected light of the center light spot, sensing with separate detection means the reflected light bundles of the outer light spots, which are disposed in about track direction at about equal distance from the outer light spot and which are radially displaced oppositely by about equal amounts; electronically processing the signals from the separate detection means, and controlling the phase grating in its rotary position by an electromechanical drive means for an angular rotation around the eenter axis with the electronically processed signals from the separate detection means.

Thus the invention provides the use of a phase grating controlled rotatable around its center in connection with a radially acting track follower system. This can effect that undesired angular deviations of the two auxiliary light spots relative to the track direction can be corrected. It can be achieved in case of use of a control signal fed to the controllable phase grating that the main light spot does not experience a change in its position in a radial direction, that is the control signal is not superposed to the scanned information signals. Now therefore, a suitable frequency as high as desired can be employed with the recited advantage of the sufficiently large frequency distance relative to the actual radial error signal. The control of the phase grating is performed based on electrodynamically or piezoelectrically operating drive means such that the two auxiliary light spots vibrate with low amplitude around the center of the main light spot based on corresponding angular rotations around the center of the phase grating in a plane vertical to the light beam. The track deviation as well as a possibly present optical asymmetry can be detected in radial direction from the image of this motion of the auxiliary light spots relative to the track in a conventional manner and it can be employed for producing radial correction signals. It is possible to take into consideration in advance known angular deviations of the auxiliary light spots with an additional provision for the control of the phase grating. For this purpose a memory, preferably a read only memory (ROM), is connected ahead of a conventional digital to analog converter, the output signals of which are providing the drive means for the phase grating.

Such angular deviations are present for example if a dependency of the tangent error angle on the scanning radius results based on the geometrical construction situation, which both under the operational mode "regular scanning" as well as under the operational mode "search run" calculates deviations based on the coordination of the known angular errors to the scanning radius and based on the information of accumulated playing time present on the records and as addresses ROM locations are employed, for example comprising individually 8 bits. Under this procedure erroneous scanning results can be avoided, where the cause of the erroneous scanning results are to be found in angular deviations known in advance.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

In the accompanying drawing, in which are shown several of the various possible embodiments of the present invention.

DESCRIPTION OF INVENTION AND PREFERRED EMBODIMENT

Figure 1:
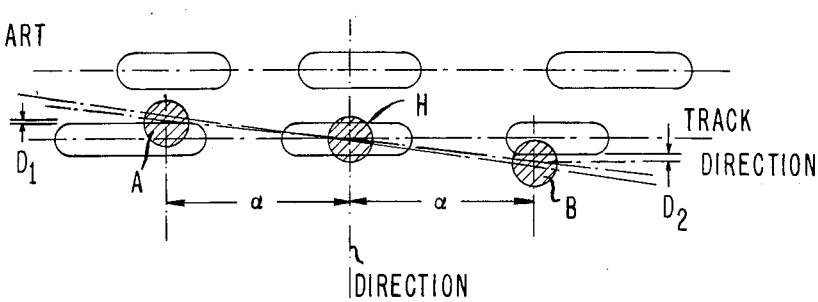
FIG. 1 is a schematic view of the position of the light spots at a three beam optical scanner according to the state of the art.

In accordance with the present invention there is provided a radially acting track follower system with an optical scanner for an audio or video record playing reproduction apparatus, which system generates three light spots disposed on a line with a movable phase grating. The line of light spots is preferably a straight line. The position of the light spots is adjustable relative to the tangent at the track sensing position. The middle light spot provides the signal to be used and possibly the focussing readjustment signal after reflection according to the track information based on a detection means and following electronic processing. The reflected light bundles of the light spots, which impinge in the track direction at about equal distance from the center light spot and which are radially displaced oppositely to each other by about equal amounts, are fed to separate detection means, which in turn provide the control or automatic control signals for the radial track follower system. The phase grating (Ph) is rotatably disposed around its center axis and is constructed to be operated by an automatic control, where the center axis corresponds to the beam axis for the center light spot at the location of the phase grating. Drive means for an angular rotation motion (α) of the phase grating around its center axis are provided, which can either electrodynamically or piezoelectrically operate.

The phase grating Ph can be provided as a disk and the disk can be disposed in a radially magnetized magnet ring 12, which is rotation controlled and supported between two bearings 10, 11 with fixed location relative to the casing and two coils 13, 14 fixed in their position relative to the casing effect a torque onto the rotary part via air gaps upon a respective controlled power provision.

The phase grating Ph can be provided as a disk, which is attached to a frame 9, which is rotatably supported next to the axis and where one protruding bearing axis 8a is in a power connection with one end of either a piezoelectric torsion bender 7 or torsion plate or an electrodynamical drive 5 and where the other bearing axis 8 is provided with a support allowing rotation. A deflection mirror or a semitransparent beam divider U after the phase grating Ph as well as a laser source Q ahead of the phase grating Ph can be disposed at a fixed location relatively to the case.

The phase grating provision can be excited with a control signal known in principle of more than 600 hertz and of preferably more than 1000 hertz and more preferably of more than 2000 hertz, whereby the outer light spots A, B vibrate by about 0.05 micrometer in radial direction.

An elastic element 15 known in principle can be provided between the rotary part 16 of the phase grating provision Ph and the case 10. The elastic element can be constructed such that it provides both a radial restoring force as well as some damping.

The phase grating Ph can be attached to one end of a tabe 17, which tube carries about its middle the magnet ring 12 and the other end of the tube 17 can have attached a laser diode Q as a light source.

The light spots A, B coordinated to the track follower control can cooperate with first and second detection elements (Det. A and Det. B). The signals generated by the first detection element Det. A can be delayed by half a period of the control signal with electronic means (signal A') and can then be added to the signal of the second detection element Det. B such that in case of an optimum position of the two auxiliary spots relative to the track to be scanned there results a sum signal of about 50 percent of the maximum possible sum signal, while an angular rotation can result in a shifting of the control signal in each case in the positive or negative direction. The thus obtained signal can control the phase grating Ph.

Angle deviations typical for scanning errors or proportional angle deviations at certain scanning radii for a certain record player drive mechanism can be stored in a read only memory ROM and this read only memory can be disposed ahead of a conventional digital to analog converter. The output signal of the digital to analog converter can be employed as a control parameter for the controllable phase grating. Binary signal sequences can be calculated from the accumulated playing time present as an information on the record both for the regular scanning process as well as for the operational mode "Search Run" and for example blocks of eight bits can be employed as address for the read only memory ROM.

Referring now to FIG. 1, there is shown a track section of two neighboring tracks according to the state of the art. The track just sensed by the main light spot H is in this case the lower one of the two. The two main light spots A and B are shown at a distance a from the main light spot and are oppositely displaced in radial direction relative to the track. The parameters $D_1$ and $D_2$ shown are generated for example by rotation of the phase grating Ph (FIG. 2) around its center and they are undesirable. However, they are not completely avoidable in case of a swivel arm scanning. In each case the phase grating Ph can be adjusted optimally only for one track radius. FIG. 3 illustrates graphically what effects this has for the resulting error angle $\delta$ at different light spot distances a. For example, if a resulting error angle of 1 degree is present and the auxiliary light spot distance from the main light spot of 15 micrometer is considered, then already a deviation of the auxiliary light spots from their intended set position of about $D_{1,2}$ $Max = 0.14$ micrometer or, respectively, 0.32 micrometer corresponding to different adjustment procedures. According to experience, a deviation of $D_{1,2\ Max}$ of 0.1 micrometer has to be considered as a limit for the scanning safety (compare FIG. 3). The light path is shown in principle in FIG. 2, where a phase grating Ph is employed for the generation of the two auxiliary light spots A and B. A light bundle runs from the light source Q, for example a laser diode, to the phase grating Ph.

According to diffraction pattern phenomena three partial light beam bundles are generated, which are directed to the mirror 1 by the semi-transparent mirror 2. The beam bundles reflected there are in each case focussed by a further collection lens $S_2$ in the plane of the reflection layer and result in the light spots A, H, and B. The reflected light bundles of these light spots pass back to the semi-transparent mirror 2 on the same way, which mirror reflects them to the detection element for these light beam bundles Det. H, Det. A and Det. B.

Figure 2:
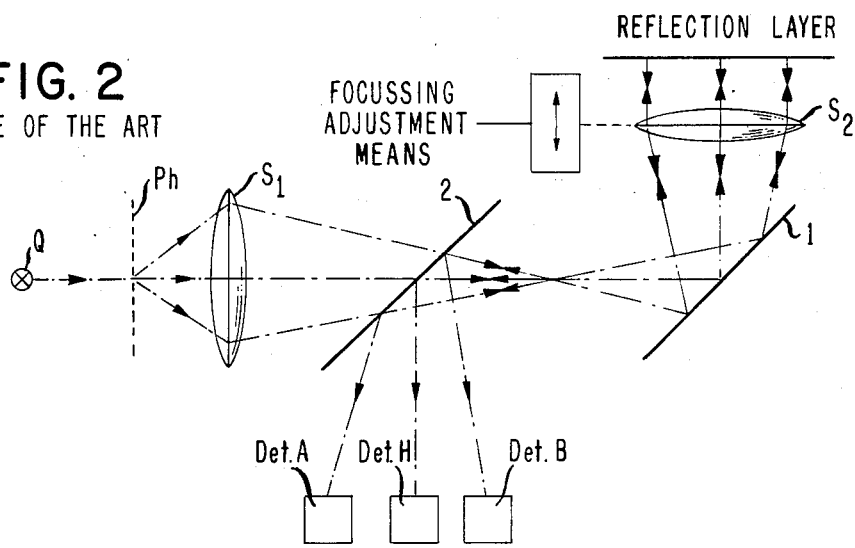
FIG. 2 is a schematic view of the beam path of the optical scanner with phase grating according to FIG. 1.
Figure 3:
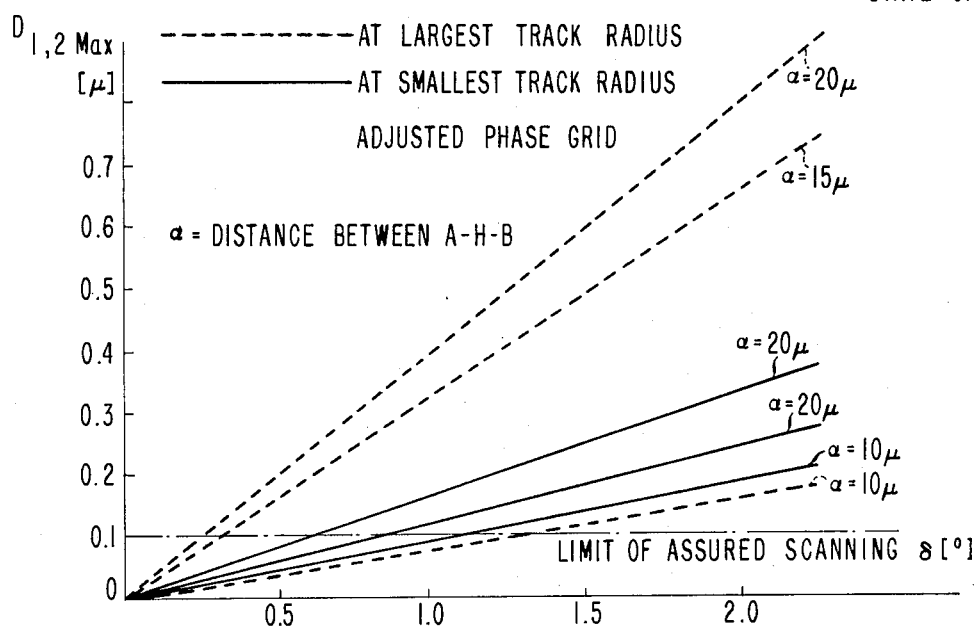
FIG. 3 is a schematic view of the undesired radial deviations $D_{1,2}$ of the auxiliary light spots from the track under consideration of a radial error angle δ according to the state of the art.

Overall, one can say to the state of the art, as is illustrated in the three FIGS. 1 to 3 that the limit for scanning safety drawn in FIG. 3 is at $D = 0.1$ micrometer, where D is the radial deviation of the auxiliary light spot from the desired set position of the track. This means that $D < 0.1$ micrometer has to be adhered to, and otherwise a disturbance of the scanning process occurs. This holds in principal both in the case of radial linear scanning as well as in case of swivel arm scanning. The error angle $\delta$ (FIG. 3) is generated from the sum of the tolerances of one of the recited scanning systems. In case of a swivel arm scanning pickup a relatively large tangent error angle caused by the construction is to be added, which error even in case of an optimum adjustment of the phase grating Ph for example at the smallest track radius results in that an error-free scanning in the outer scanning pickup region of the tracks is not any longer assured.

Figure 4:
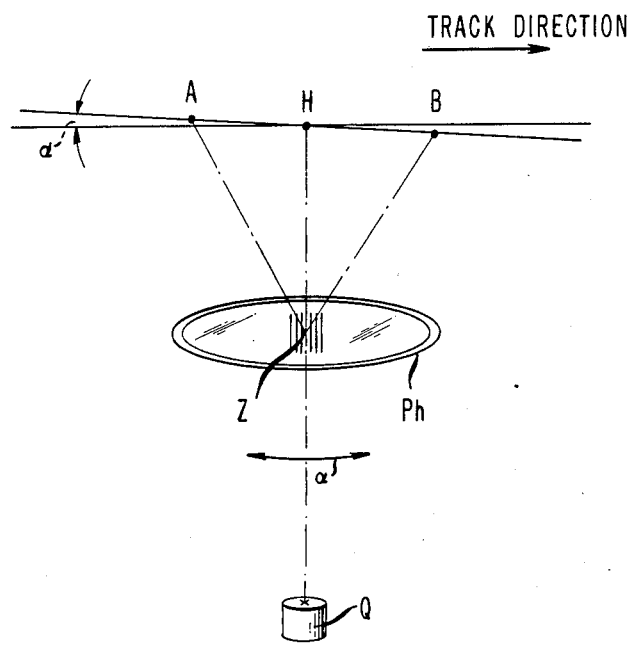
FIG. 4 is a view of a schematic representation of the rotary phase grating device.

The substitutional invention idea is schematically shown in FIG. 4. The light bundle $\Phi$ coming from a light source Q, which can be for example a laser diode, passes onto the phase grating disk Ph at the center Z. Three light bundles are generated there based on diffraction phenomina and in fact the bundles are disposed in a plane. In this configuration the three light bundles pass to the disk shaped information carrier to be scanned for the signal to be picked up. The three light spots generated are disposed with their centers on a straight line. They are designated as auxiliary light spots A and B as well as main light spot H. A rotation of the phase grating Ph by an angle $\alpha$ around its center Z effects an angular deviation $\alpha'$ of this straight line relative to the direction of the track.

Figure 5:
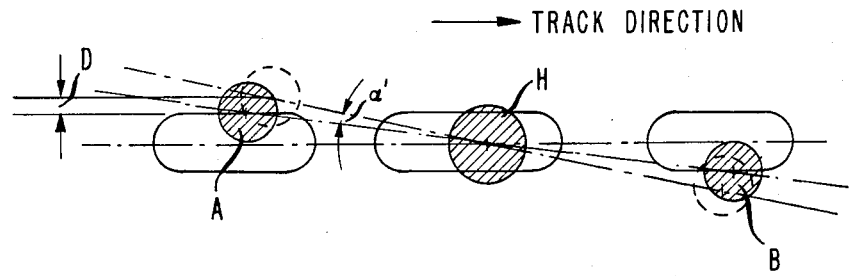
FIG. 5 is a schematic view of the principle of rotation of the auxiliary light spots around the center of the main light spot by an angle α'.

The right location of the light spots relative to the information track is shown in FIG. 5. An undesired deviation in radial direction by the amount D corresponding to the enlargement of the angle deviation $\alpha'$ can be recognized. According to the invention, it is possible to detect and determine the amount D of the deviation and to adjust the phase grating Ph by a corresponding rotation with a drive means, which is in turn driven by a control signal formed from the detection means such around its center Z by the angle $\alpha$, that the angle deviation and thus the amount D of the deviation are controlled down to zero. Therewith the main light spot H remains stationary on the information track.

Thus it is possible to apply the initially mentioned improvement of the track follower properties by applying a control signal to the radially acting track follower system. It is possible therewith to employ frequencies which are much higher than 500 or 600 hertz, such as for example 10 kilohertz, since no superposition of the control signal with the scanned information signals is possible.

Figure 6A:
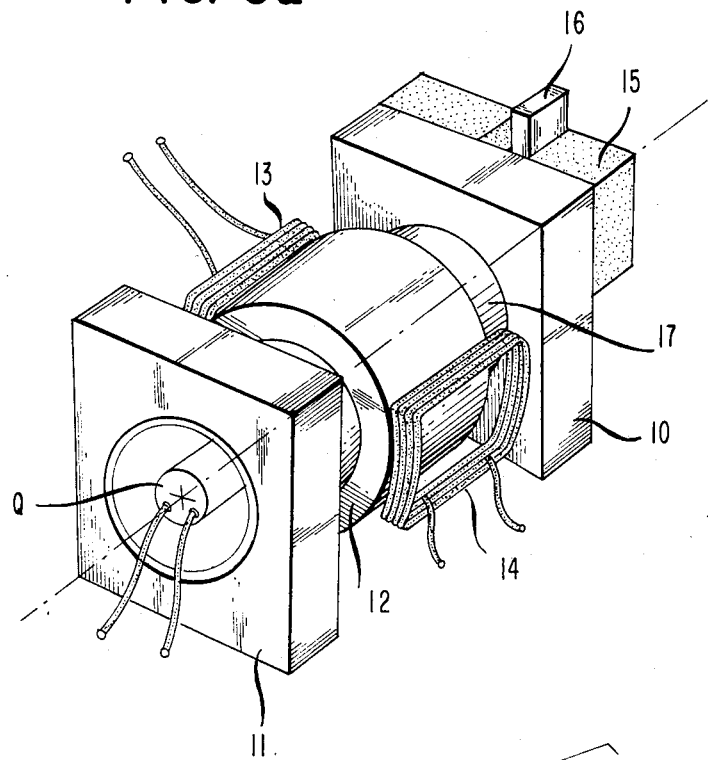
FIG. 6a is a schematic perspective view of an embodiment of a compact electrodynamic drive for a controllable phase grating.
Figure 6B:
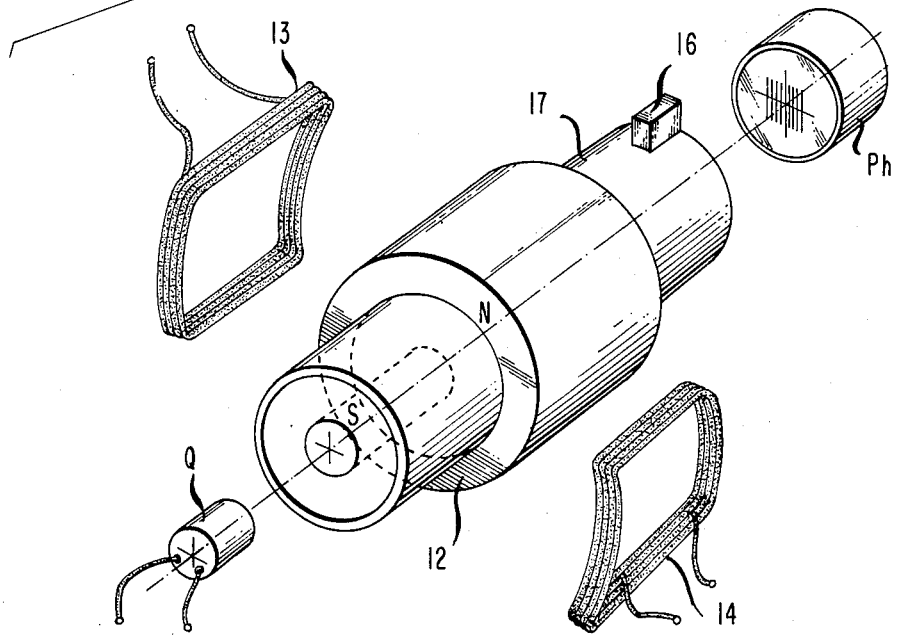
FIG. 6b is a schematic perspective exploded view of the drive of FIG. 6a, FIG. 7 is a schematic perspective view of a second embodiment of an electrodynamic drive for a controllable phase grating.

The FIGS. 6a and 6b show an embodiment according to the present invention of a drive means for the phase grating Ph. The phase grating disk Ph is rotatably supported between two bearings 10, 11 fixedly attached to the casing. It is attached at a magnet ring 12 rotatable between the bearings 10, 11. The magnet ring 12 is driven or, respectively, controlled by two coils 13, 14 fixedly attached to the case via air gaps by the inductive magnetic effect on the poles of the magnet ring 12. The control voltage applied to the coils 13, 14, which is composed of the control signal and of the control parameter derived from the detection means, effects a torque, which causes the magnet ring 12 together with the phase grating Ph to move. A elasticity element 15, which is attached to a bearing, cooperates together with a tube attachment 16 by furnishing both a restoring force as well as a damping action. The light source Q, for example a semiconductor laser, is attached next to the other end of the tube 17, which carries the magnet ring 12 and is provided centered at its other end with the phase grating Ph.

As already mentioned, the drive means for the phase grating is excited with a superposed control signal of preferably at least about 1 kilohertz and more preferred for example 10 kilohertz, and in fact such that the two auxiliary light spots A and B vibrate with a radial deviation of for example 0.05 micrometer around their center of rotation, which is the about center of the main light spot H.

Figure 9:
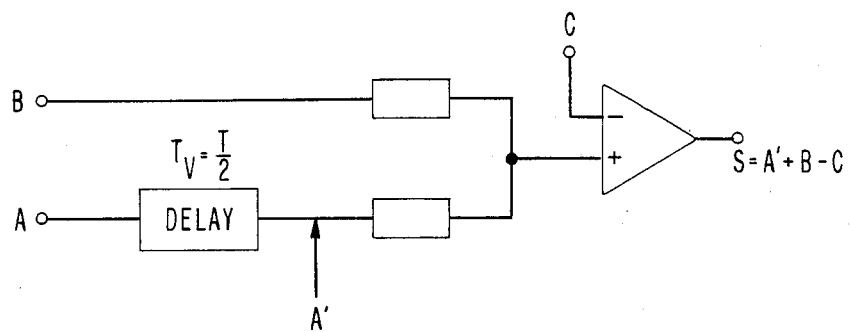
FIG. 9 is a schematic block circuit diagram illustrating the evaluation of the detection signals for the drive of the phase grating.

The processing of the detection signals A and B is illustrated in the simplified block diagram of FIG. 9 and the control signal S for the drive of the phase grating is determined accordingly. A reference signal $$C = \frac{A_o + B_o}{2}$$

is applied to the negative input of the difference amplifier.

Figure 10:
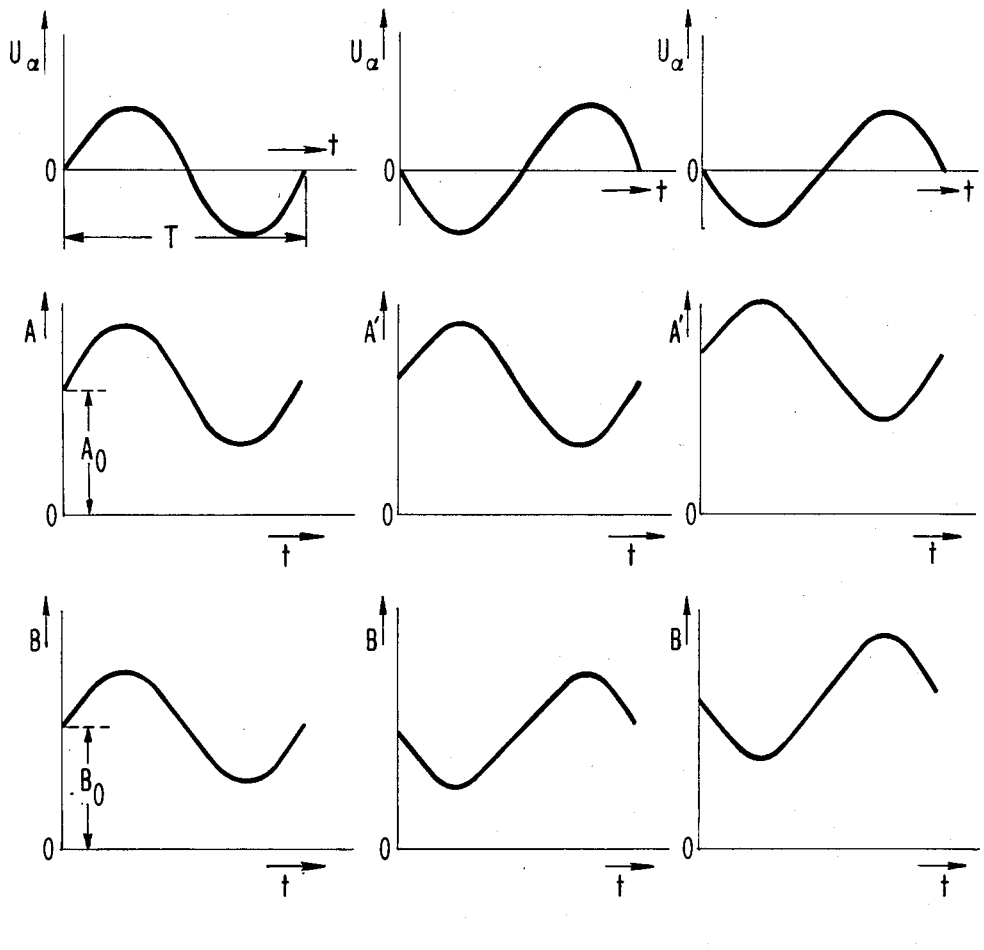
FIG. 10 is a view of a diagrammatic representation of the detection signals without and with a detection error α'.
Figure 10:
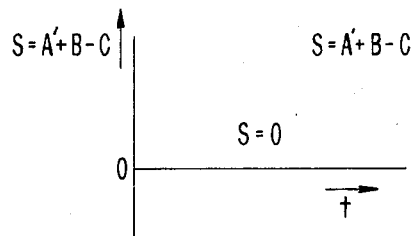

FIG. 10 illustrates graphically how the control signal $U_\alpha$ runs depending on time t over a period T and below the corresponding course of time of the detection signals A and B without error angle $\alpha'$, where the detection elements are not illustrated (FIG. 10a).

The control signal appears on the two detection elements at an equal relative phase. The signal generated in the detection element A is delayed by a half period of the control signal $U_\alpha$ and is added to the signal generated in the detection element B as well as subtracted in the following in a difference amplifier from a reference voltage C. The sum signal S=0 (FIG. 10b) in case of a right position of the auxiliary light spots A and B relative to the track and where $$C = \frac{A_o + B_o}{2}$$

Now an angular rotation effects a shifting of the signals of the detection elements in each case in positive or negative direction. The sum signal is then not any longer zero (FIG. 10b based on the delay of the detection signal A', but it is either more positive or more negative depending on the direction of the angle deviation. The sum signal does not comprise any components of the radial error signal, since however the sum of the radial parts of the light intensity captured by the detection elements is zero in case of a radial track shift away from the auxiliary light spots. Thus the sum signal can be employed with respect to size and direction as a control signal S for the phase grating control provision, or specifically for the drive means for the phase grating Ph.

If at the same time an asymmetry of the optical pickup scanner should be present and in fact such that for example by soiling and dirt differences occur in the two detection channels, then this can be employed as described above and in the same way with the control signal as an angular rotation. In contrast to conventional systems, which employ a control signal of a relatively low frequency, the present invention provides the advantage that the control signal does not affect the main light spot and thus a superposition with the scanned information signals sensed at the main light spot is avoided and cannot occur. This separation of control signal and information signal allows in addition the advantageous selection of the higher frequency of the impressed control signal.

Figure 7:
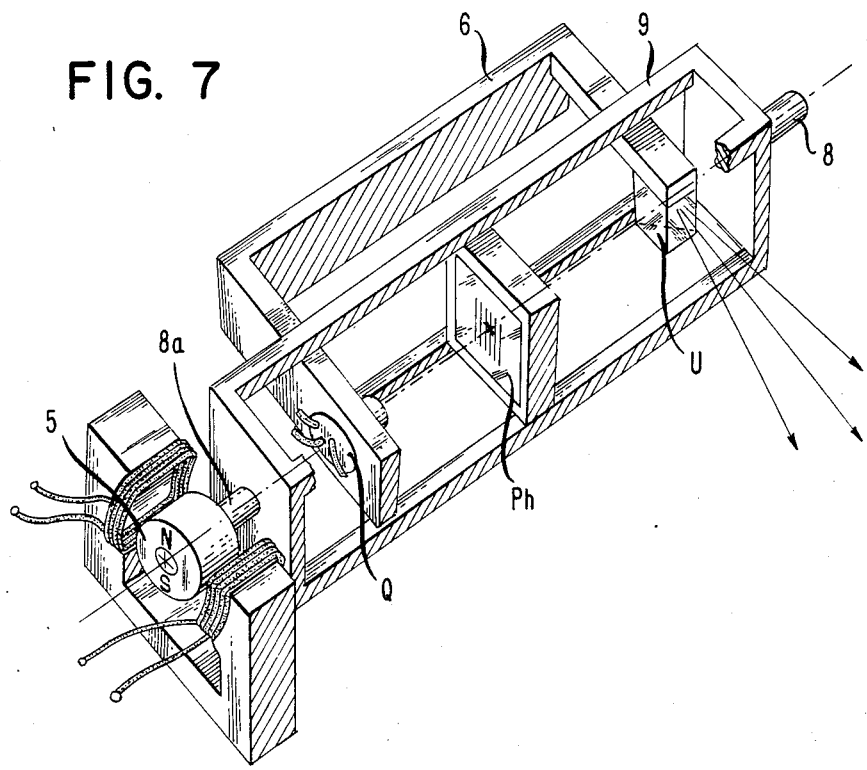
Figure 8:
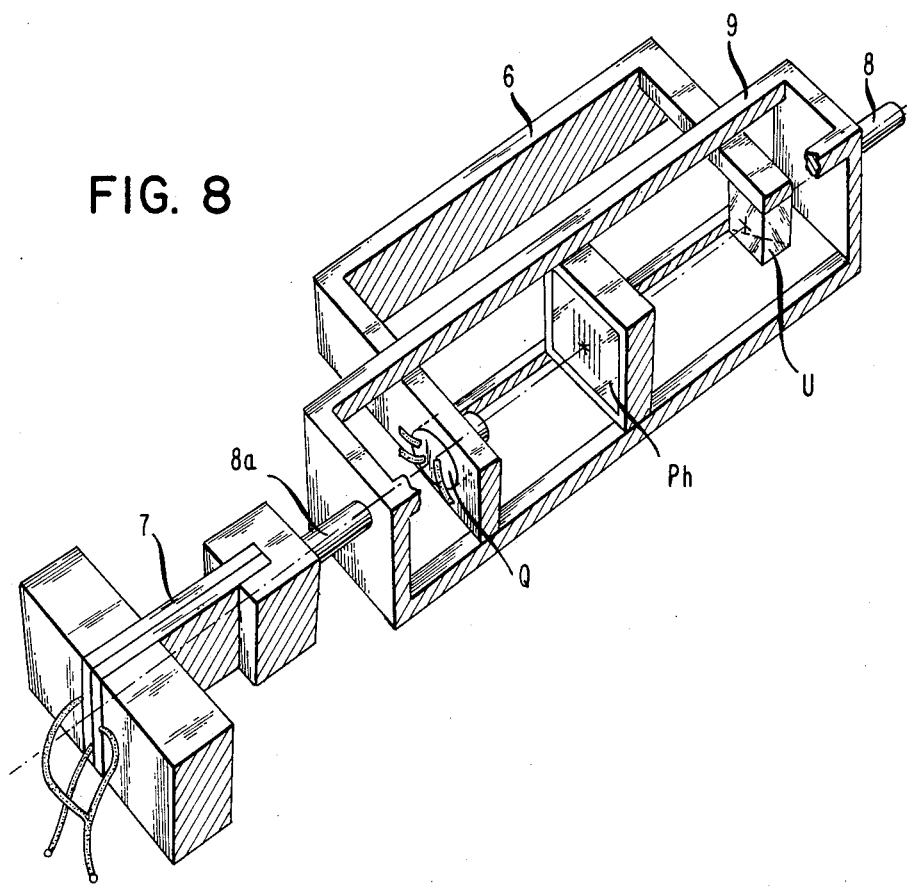
FIG. 8 is a schematic perspective view of a third embodiment showing a piezoelectric drive for a controllable phase grating.

Two other embodiments for the drive means are shown in a perspective and partially sectional view in FIGS. 7 and 8. An electrodynamic drive 5 for the phase grating and a bearing support close to the axis are shown in FIG. 7. The light source Q and a deflection mirror U are disposed ahead of and following to the phase grating Ph at a spacially fixed support within the driven tilting provision with the frame 9. The light source Q and the deflection mirror U can also be provided as a partially transparent beam divider depending on the other construction features of the optical pickup scanner, where similar to the illustration in FIG. 2 the reflected light is separated from the emitted light. The two two sided axes 8 and 8a are rotary movable disposed and supported in a way not illustrated. FIG. 8 shows similar construction features as FIG. 7 and a corresponding illustration with a piezoelectric torque converter 7 as a drive means.

Figure 11:
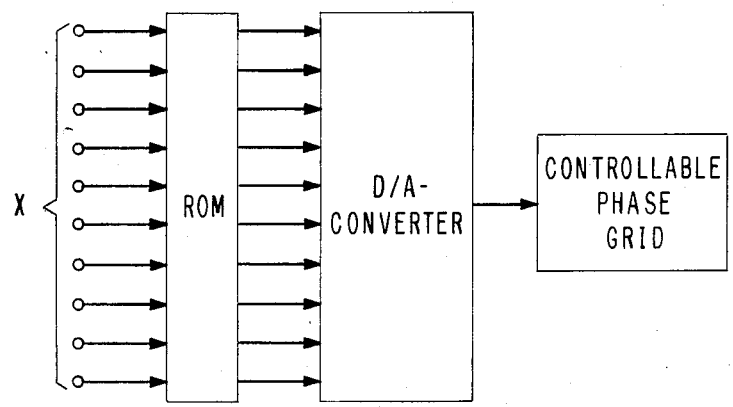
FIG. 11 is a view of a simplified block diagram illustrating the employment of a ROM ahead of a digital to analog converter as an auxiliary provision for controlling of known angular deviations of the auxiliary light spots, for example during a search run.

Finally, FIG. 11 presents a simple block diagram for an auxiliary provision. It permits to take into consideration in advance known angular deviations of the auxiliary light spots by predisposing a read only memory ROM to the conventional digital to analog converter, which provides the control signal for the phase grating. It is covered via its inputs with parameters X, which are the ROM address, which results from the calculation of the "jump" address.

Angle deviations are known in advance for example if a deviation of the tangent error angle from the scanning radius results based on the geometrical construction situation and where both at the regular scanning as well as in the operation mode "search run" in each case the angle deviation is calculated from the "jump" size, for example provided as the number of tracks to be jumped over in each case. The number of the tracks to be jumped over is employed as an address of the ROM while the already scanned tracks are taken into consideration. The address can comprise for example 8 individual bits. The already scanned or finished tracks are the number of tracks, which are determined from the start of the track region of the record to the momentary scanning pickup point in radial direction. The determination of this number is calculated in conventional playback apparatus from the accumulated time and is thus already available.

The advantage of this additional provision includes the avoidance of an erroneous scanning. In case of extremely large tangent angles an undesired getting stuck of the radial servo circuit could occur without a control of the in advance known angle deviations via the two auxiliary light spots onto the tracks neighboring to the main track. This can be definitely avoided according to this embodiment.

It will be understood that each of the elements described above, or two or more together, may also find a useful application in other types of disk track system configurations and signal pickup procedures differing from the types described above.

While the invention has been illustrated and described as embodied in the context of an optical track follower system for audio or video recorder players, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A radially acting track follower device comprising a light source generating a light beam;

a rotatable phase grating disposed in a path of the light beam and generating three light spots disposed about a line on a record disk where two outer spots are disposed at about equal distances from a center spot and where the outer spots can be adjusted in their position relative to a track tangent at a track sensing position and where the phase grating is rotatably disposed around its center axis and where the position of the center axis corresponds to a beam axis of a center light spot;

detection means for detecting the center light spot after reflection, said center light spot being modulated with information from a track;

electronic processing means connected to the detection means for processing an information signal from the detection means;

separate detection means for detecting reflected light bundles of the outer spots;

control means connected to the separate detection means to provide control and automatic adjustment signals for a radial track follower device; and electromechanical device means connected to the control means to provide an angular rotation of the phase grating around its center axis.

2. The radially acting track follower device according to claim 1 wherein the information is video information.

3. The radially acting track follower device according to claim 1 further comprising focussing adjustment means connected to the detection means for the center light spot.

4. The radially acting track follower device according to claim 1 wherein the electromechanical drive means is an electrodynamic arrangement.

5. The radially acting track follower device according to claim 1 wherein the electromechanical drive means is a piezoelectric arrangement.

6. The radially acting track follower device according to claim 1 further comprising a casing;

a radially magnetized magnet ring having attached the phase grating formed as a disk, which magnet ring is rotatably disposed at two bearings at the casing;

two coils disposed at the case and separated by an air gap from the magnet ring, which upon a corresponding current flow generate a torque on the magnet ring.

7. The radially acting track follower device according to claim 1 further comprising a frame having attached the phase grating formed as a disk, where the frame is rotatably supported on an axis;

a piezoelectric tension bending provision actuating a protruding bearing axis of the frame; and a rotary support for a second bearing axis of the frame;

a deflection mirror disposed after the phase grating.

8. The radially acting track follower device according to claim 1 further comprising a frame having attached the phase grating formed as a disk, where the frame is rotatably supported near the axis;

a piezoelectric tension bending provision actuating a protruding bearing axis of the frame;

a rotary support for a second bearing axis of the frame; and a semi-transparent beam divider disposed after the phase grating.

9. The radially acting track follower device according to claim 1 further comprising a frame bearing having attached the phase grating formed as a disk, where the frame is rotatably supported near the axis;

an electrodynamic drive actuating a protruding bearing axis of the frame;

a rotary support for a second bearing axis of the frame; and a deflection mirror disposed after the phase grating.

10. The radially acting track follower device according to claim 1 further comprising a frame bearing attached to the phase grating formed as a disk, where the frame is rotatably supported near the axis;

an electrodynamic drive actuating a protruding bearing axis of the frame;

a rotary support for a second bearing axis of the frame; and a semi-transparent beam divider disposed after the phase grating.

11. The radially acting track follower device according to claim 1, wherein the phase grating is driven by a control signal having a frequency of at least 1000 hertz.

12. The radially acting track follower device according to claim 1 wherein the rotation of the phase grating causes an adjustment of the outer spots of less than 0.04 micrometer.

13. The radially acting track follower device according to claim 1 further comprising an elastic element disposed between the rotary part of the phase grating and a casing, which elastic element generates a radial restoring force and which damps the motion of the phase grating.

14. The radially acting track follower device according to claim 1 further comprising a tube supporting the phase grating at one of its ends;

a laser diode mounted at the other end of the tube; and a magnet ring attached to about the middle of the tube.

15. The radially acting track follower device according to claim 1 wherein the separate detection means comprises a first detection element coordinated to one outer spot;

a second detection element coordinated to the second outer spot;

an electronic phase shifting means for delaying the signal generated by the first detection element by half a period of the control signal;

adding means for adding the phase shifted signal from the first detection element and the signal from the second detection element such that in case of an optimum position of the two light spots relative to the track to be followed a sum of signal S of about 50 percent of the maximum sum signal results, while an angular rotation results in a shift of the control signal in each case in the positive or, respectively, negative region.

16. The radially acting track follower device according to claim 1 further comprising a memory storage for storing angular deviations at a certain sensing radius for a certain record player typical for sensing errors and/or proportional to angular deviations and having an output;

an analog-to-digital converter connected to the output of the memory storage and having in turn an output providing the control signal for the rotatable phase grating, where sequences are calculated based on the accumulated time present on the disk as information.

17. The radially acting track follower device according to claim 16 wherein blocks comprising 8 bits are employed as an address for the memory storage.

18. A method for following a track of a record comprising providing light with a light source generating three light spots disposed on a line with a phase grating rotatable around its center axis and the position of the center axis corresponds to a beam axis for a center light spot;

adjusting the light spots in their position relative to a track tangent at a track sensing position by rotatably controlling the rotatable phase grating by an electromechanical drive means;

sensing reflected light of the center light spot to provide a signal that represents information in the track;

electronically processing the sensed reflected light of the center light spot;

sensing with separate detection means, reflected light bundles of two outer light spots, which are disposed at equal distances from the center light spot in the tangential track direction and which are radially displaced oppositely by about equal amounts;

electronically processing the signals from the separate detection means; and controlling the electromechanical drive means with the electronically processed signals from the separate detection means.

19. The method for following the track of a record according to claim 18 wherein the light source is a laser, and further comprising focussing the center light spot with a focussing adjustment means connected to the detection means for the outer light spots.

* * * * *